United States Patent Office 2,782,218
Patented Feb. 19, 1957

2,782,218

1-FLUORO-1,2-DICYANO-2-HYDROCARBON SUBSTITUTED ETHYLENES, AND THEIR PREPARATION FROM THE CORRESPONDING 1,1-DIFLUORO-2-CYANOETHYLENES AND ALKALI CYANIDES

John Jay Drysdale, Clifton Park Manor, Del., assignor to E. I. du Pont de Nemours and Company, Wilmington, Del., a corporation of Delaware No Drawing. Application May 6, 1955,
Serial No. 506,653

12 Claims. (Cl. 260—465.7)

This invention relates to unsaturated fluoronitriles and to a method for their preparation.

Fluorinated olefinic nitriles have various applications since they contain both fluorine and nitrile groups. One such application wherein fluorocyanoolefins are particularly valuable is in the field of biological activity. However, the value of particular compounds varies widely since other groupings are present in the molecule besides the fluoro and the cyano groups. In the intensive search for compounds having new specific biological applications it is highly desirable to have new combinations of groups.

This invention has as an object a class of new compounds of marked biological activity. A further object is the preparation of new solvents. Other objects will appear hereinafter.

These objects are accomplished by the present invention of compounds of the formula $$\text{NC}-\overset{\text{F}}{\underset{}{\text{C}}}=\overset{\text{R}}{\underset{}{\text{C}}}-\text{CN}$$

wherein R is a saturated monovalent hydrocarbon or perfluorocarbon radical, i. e., an alkyl, perfluoroalkyl, cycloalkyl, or perfluorocycloalkyl radical, i. e., an organic radical wherein the carbon atoms are only singly bonded and then to atoms of one or more monovalent non-metallic elements of atomic number no greater than 9.

A group, preferred because of availability of intermediates, of the products of this invention is that of the 1-fluoro-1,2-dicyanoethenes having on the 2-carbon a non-aromatic saturated hydrocarbon radical of up to seven carbon atoms, i. e., a lower alkyl or cycloalkyl radical, i. e., a saturated hydrocarbon radical of aliphatic character.

The fluorodicyanoolefins of this invention are prepared by bringing a β,β-difluoroacrylonitrile having a saturated monovalent hydrocarbon or perfluorocarbon radical in the alpha position, i. e., a compound of the formula $$\text{F}_2\text{C}=\overset{\text{R}}{\underset{}{\text{C}}}-\text{CN}$$

wherein R is a saturated monovalent hydrocarbon or perfluorocarbon radical, in contact with at least an equimolar quantity of an aqueous alkali metal cyanide and this process represents a further phase of the present invention.

The reaction of the α-alkyl (or perfluoroalkyl, cycloalkyl, or perfluorocycloalkyl)-β,β-difluoroacrylonitrile with the alkali metal cyanide takes place at ordinary or elevated temperatures. Temperatures of 0° C. up to 50° C. or more are operable. It is preferable to carry out the reaction below 50° C. since temperatures above 50° C. tend to result in lower yields. The reaction is exothermic and the temperature of the reaction mixture can be readily controlled by the amount of water used as a diluent or by the use of external cooling means.

The reaction is conveniently carried out with potassium cyanide as the alkali metal cyanide. However, sodium cyanide or lithium cyanide can also be used if desired. The proportion of alkali metal cyanide employed is preferably at least an equimolar amount based on the amount of α-alkyl (or perfluoroalkyl, cycloalkyl, or perfluorocycloalkyl)-β,β-difluoroacrylonitrile being used. An excess of alkali metal cyanide can be used if desired, although this has no practical advantage. The amount of water in the reaction system is not critical. Any proportions that are convenient can be used. Amounts ranging from one to ten times the weight of the fluoroacrylonitrile are entirely satisfactory. Since the organic reactants and products are not appreciably soluble in water, it is necessary to stir or agitate the reaction mixture throughout the reaction period in order to obtain intimate contact of the alkali metal cyanide with the difluoroacrylonitrile.

The alkali metal cyanides used in the process of this invention can be the commercial materials that are commonly available. The α-alkyl (or cycloalkyl)-β,β-difluoroacrylonitriles used as starting materials in the process of this invention can be prepared by pyrolyzing at a temperature of 600° C.–1000° C. a cyclobutane of the formula

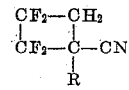

wherein R is a saturated hydrocarbon or perfluorinated hydrocarbon radical of up to seven carbon atoms. This pyrolysis process is described in greater detail in U. S. application Serial No. 465,748, filed October 29, 1954, by John L. Anderson, now U. S. Patent 2,773,089, issued December 4, 1956.

The following examples in which parts are by weight are illustrative of the invention.

Example I

Seven parts of a mixture of approximately equal amounts of α-tert-butylacrylonitrile and α-tert-butyl-β,β-difluoroacrylonitrile is stirred with 1.3 parts of potassium cyanide dissolved in 10 parts of water. The reaction temperature rises to 38° C. during about 45 minutes and then falls to 25° C. during another 15 minutes. The reaction mixture is then extracted with 50 parts of diethyl ether and, after separating from the aqueous layer, the ether extract is distilled. There is obtained 0.4 part of 1-fluoro-2-tert-butyl-1,2-dicyanoethene, boiling at 45–50° C./6 mm. of mercury, and having a refractive index, $n_D^{25}$, of 1.4422.

*Analysis.*—Calculated for C₈H₉FN₂: C, 63.15%; H, 6.15%. Found: C, 63.67%; H, 6.15%.

Example II

A mixture consisting of 11 parts of β,β-difluoro-α-methacrylonitrile, 6.9 parts of potassium cyanide, and 100 parts of water is stirred for one hour. An exothermic reaction takes place, and the reaction temperature rises to 45° C. during 5 minutes and then falls to room temperature is about 55 minutes more. The reaction mixture consists of an upper aqueous layer and a lower organic layer. The organic layer is separated and then dissolved in 50 parts of ether and treated with decolorizing carbon. The decolorized ether solution is subjected to distillation, and, after removal of the ether, there are obtained the following fractions, each fraction amounting to one part by weight:

| Fraction | Boiling Point at 20 mm. Mercury | Refractive Index, $n_D^{22}$ |
|---|---|---|
| 1 | 53 | 1.4318 |
| 2 | 53 | 1.4318 |
| 3 | 53 | 1.4318 |
| 4 | 53 | 1.4316 |
| 5 | 53–54 | 1.4310 |
| 6 | 54–60 | 1.4290 |
| 7 | 60 | 1.4260 |

Fractions 1–4, inclusive, are cis-1,2-dicyano-1-fluoro-1-propene. Fractions 5–7, inclusive, are a mixture of the cis and trans-isomers of 1,2-dicyano-1-fluoro-1-propene. The structure of these products in confirmed by infrared analysis.

*Analysis.*—Calculated for $C_5H_3FN_2$: C, 54.54%; N, 25.45%; H, 2.85%; F, 17.17%. Found (Fraction 2): C, 55.28%; N, 23.73%, 24.54%; H, 2.85%; F, 17.27%, 17.39%.

The cis-1,2-dicyano-1-fluoro-1-propene of Example II exhibits strong antibacterial action when tested by test tube dilution assay with representative bacteria. In this test the minimum concentration at which the 1,2-dicyano-1-fluoro-1-propene prevents bacterial growth is determined. Ten milligrams of the compound being tested is dissolved in a small amount of acetone containing sodium bicarbonate, and the mixture is diluted to 10 ml. with sterile 2% tryptose broth. A series of six test tubes (tubes 1, 2, 3, etc.), each containing 2 ml. of sterile 2% tryptose broth, is prepared. A total of 2 ml. of the solution containing the fluorodicyanopropene is added to tube 1, the solution is thoroughly mixed, and 2 ml. from the latter tube is transferred to tube 2. After mixing, this procedure is repeated for the other tubes in the series, with 2 ml. from the final tube being discarded. The tubes then contain the following concentrations of the fluorodicyanopropene: tube 1, 500 micrograms/ml.; tube 2, 250 micrograms/ml.; tube 3, 125 micrograms/ml.; tube 4, 62.5 micrograms/ml.; tube 5, 31.25 micrograms/ml.; and tube 6, 15.6 micrograms/ml. Cultures of the four test organisms (*Micrococcus pyogenes* var. *aureus*, H strain; *Streptococcus faecalis*, 10Cl; *Escherichia coli*, 6A; *Pseudomonas aeruginosa*, Temple strain) are grown in 2% tryptose broth for 18–24 hours at 37° C. and then diluted 1:10 in sterile tryptose broth. Tubes 1–6, described above, together with a control are inoculated with 0.1 ml. of the 1:10 culture dilutions and the tubes are incubated at 37° C. for 18–24 hours. The tubes are then examined for the presence or absence of bacterial growth. The concentration of 1,2-dicyano-1-fluoro-1-propene in micrograms/ml., at and above which no bacterial growth occurs, is 31.25 micrograms/ml. with *M. aureus*, *S. faecalis*, and *P. aeruginosa;* and the minimum concentration against *E. coli* is 62.5 micrograms/ml.

The 1,2-dicyano-1-fluoro-1-propene has unexpected bactericidal action in direct comparison with fluorofumaronitrile and fluoromaleonitrile. A mixture of fluorofumeronitrile and fluoromaleonitrile was tested for antibacterial action by the test tube dilution assay method described above. In this test the minimum inhibitory concentration of the mixture of fluorofumaronitrile and fluoromaleonitrile for *M. aureus* and *E. coli* was found to be 125 micrograms/milliliter and for *S. faecalis* and *P. aeruginosa* 250 micrograms/milliliter. These values are much higher than the minimum inhibitory concentrations for 1,2-dicyano-1-fluoro-1-propene given above.

When the potassium cyanide of Examples I and II is replaced with equivalent amounts of sodium cyanide and lithium cyanide, similar results are obtained.

The examples have illustrated the process of this invention by the use of two α-alkyl-β,β-difluoroacrylonitriles. However, any β,β-difluoroacrylonitrile having in the alpha position a monovalent saturated hydrocarbon or fluorocarbon radical, and preferably a hydrocarbon radical of up to seven carbon atoms, can be used. For example, when the processes of Examples I and II are repeated but with the α - methyl - and α - tert - butyl - β,β - difluoroacrylonitriles replaced with equivalent quantities of α - ethyl - β,β - difluoroacrylonitrile, α - n - propyl - β,β - difluoroacrylonitrile, α - isopropyl - β,β - difluoroacrylonitrile, α - isobutyl - β,β - difluoroacrylonitrile, α - n - butyl - β,β - difluoroacrylonitrile, α - n - heptyl - β,β - difluoroarcylonitrile, α - cyclobutyl - β,β - difluoroacrylonitrile, α - cyclopentyl - β,β - difluoroacrylonitrile, α - cyclohexyl - β,β -difluoroacrylonitrile, α - trifluoromethyl - β,β - difluoroacrylonitrile, α - perfluoro - n - propyl - β,β - difluoroacrylonitrile, and α - perfluorocyclobutyl - β,β - difluoroacrylonitrile, the following fluorodicyanoolefins are obtained: 1 - fluoro - 2 - ethyl - 1,2 - dicyanoethene, 1 - fluoro - 2 - n - propyl - 1,2 - dicyanoethene, 1 - fluoro - 2-isopropyl-1,2-dicyanoethene, 1-fluoro-2-isobutyl-1,2-dicyanoethene, 1 - fluoro - 2 - n - butyl - 1,2 - dicyanoethene, 1 - fluoro - 2 - n - heptyl - 1,2 - dicyanoethene, 1 - fluoro - 2 - cyclobutyl - 1,2 - dicyanoethene, 1 - fluoro - 2 - cyclopentyl - 1,2 - dicyanoethene, 1 - fluoro - 2 - cyclohexy - 1,2 - dicyanoethene, 1 - fluoro - 2 - trifluoromethyl - 1,2 - dicyanoethene, 1 - fluoro - 2 - perfluoro - n - propyl - 1,2 - dicyanoethene, and 1 - fluoro - 2 - perfluorocyclobutyl - 1,2 -dicyanoethene.

The fluorodicyanoolefins of this invention are useful as solvents for various organic materials, e. g., telomer alcohols from tetrafluoroethylene and methanol, polyvinyl fluoride, and polyvinylidene fluoride. They are also useful as chemical intermediates. For example, the fluorodicyanoolefins of this invention can be hydrolyzed by means of acids, e. g., sulfuric acid, to cyclic anhydrides of the formula

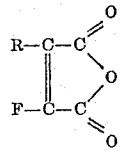

where R is a monovalent hydrocarbon or fluorinated hydrocarbon radical. These anhydrides are useful as alkyd resin components. Thus they may be reacted with glycerol or glycol to give resins for use in coating compositions. They can be reduced with lithium aluminum hydride in ether, chilled by an ice bath, to the corresponding diamines,

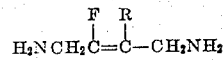

which are useful for reacting with dicarboxylic acids such as adipic, sebacic and azelaic acids, to form polyamides which can be formed into films, filaments and fibers. They can also be reacted with dienes to give cylohexenes of the formula, e. g.,

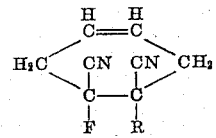

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. 1,2-dicyano-1-fluoro-1-propene.
2. 1,2-dicyano-1-fluoro-3,3-dimethyl-1-butene.
3. A 1,2-dicyano-1-fluoro-2-(lower alkyl) ethene.
4. A 1,2-dicyano-1-fluoroethylene having on the 2-carbon a saturated hydrocarbon radical of aliphatic character and of not more than seven carbon atoms.
5. A fluorodinitrile of the formula

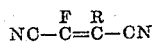

wherein R is a saturated organic radical of up to seven carbons, of the class consisting of alkyl, cycloalkyl, perfluoroalkyl, and perfluorocycloalkyl radicals.

6. A process for the preparation of a fluorodinitrile which comprises bringing a difluoronitrile of the formula

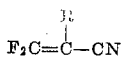

wherein R is a saturated organic radical of up to seven carbons, of the class consisting of alkyl, cycloalkyl, perfluoroalkyl, and perfluorocycloalkyl radicals in contact with an aqueous solution of at least one mole, per mole of the nitrile, of an alkali metal cyanide.

7. Process of claim 6 where the cyanide is potassium cyanide.

8. Process for the preparation of fluorodinitriles which comprises bringing an ethene carbonitrile having two fluorine atoms on the carbon beta to the cyano group and having, on the carbon alpha to the cyano group, a saturated hydrocarbon radical, in contact with an aqueous solution of at least one mole, per mole of the nitrile, of an alkali metal cyanide.

9. Process for the preparation of fluorodinitriles which comprises bringing an ethene carbonitrile having two fluorine atoms on the carbon beta to the cyano group and having, on the carbon alpha to the cyano group, an alkyl radical, in contact with an aqueous solution of at least one mole, per mole of the nitrile, of an alkali metal cyanide.

10. Process for the preparation of fluorodinitriles which comprises bringing an ethene carbonitrile having two fluorine atoms on the carbon beta to the cyano group and having, on the carbon alpha to the cyano group, an alkyl radical of up to seven carbon atoms, in contact with an aqueous solution of at least one mole, per mole of the nitrile, of an alkali metal cyanide.

11. Process for the preparation of fluorodinitriles which comprises bringing β,β-difluoromethacrylonitrile in contact with an aqueous solution of at least one mole, per mole of the nitrile, of an alkali metal cyanide.

12. Process for the preparation of fluorodinitriles which comprises bringing β,β-difluoro-α-tert.butylacrylonitrile in contact with an aqueous solution of at least one mole, per mole of the nitrile, of an alkali metal cyanide.

References Cited in the file of this patent

UNITED STATES PATENTS

| | | |
|---|---|---|
| 2,428,907 | Clifford et al. | Oct. 14, 1947 |
| 2,439,505 | Chaney | Apr. 13, 1948 |
| 2,465,318 | Seymour | Mar. 22, 1949 |
| 2,471,767 | Mowry et al. | May 31, 1949 |
| 2,665,297 | Kurtz et al. | Jan. 5, 1954 |